May 15, 1951 G. W. SHARP 2,553,151
TOOLHOLDER
Filed May 12, 1947
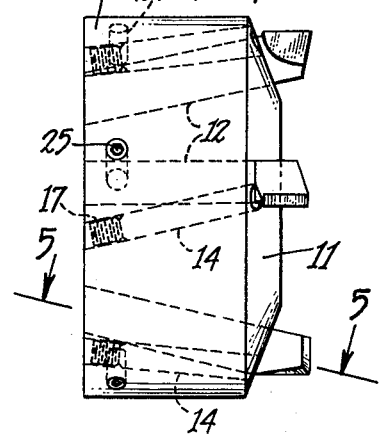
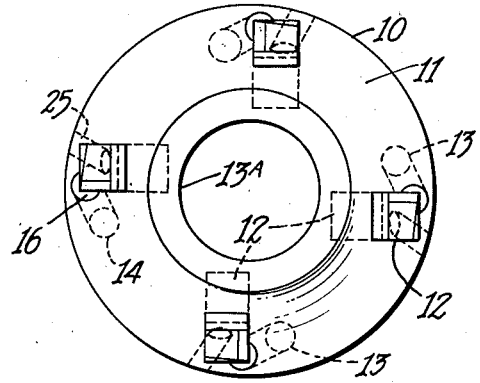
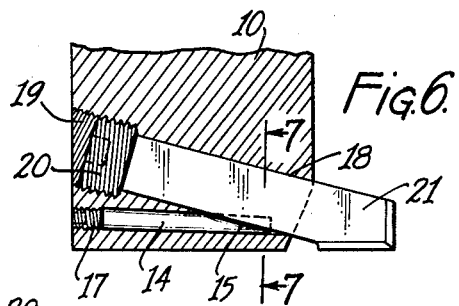
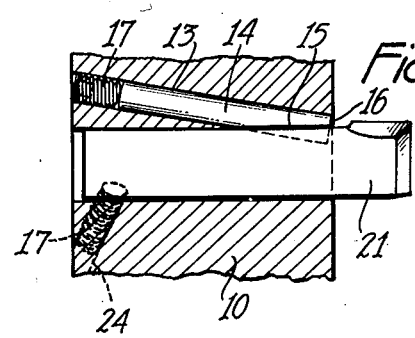
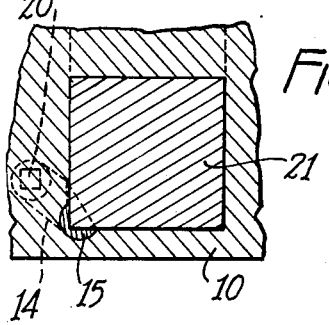
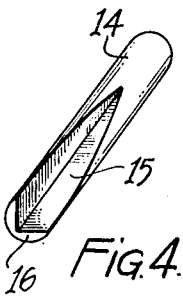
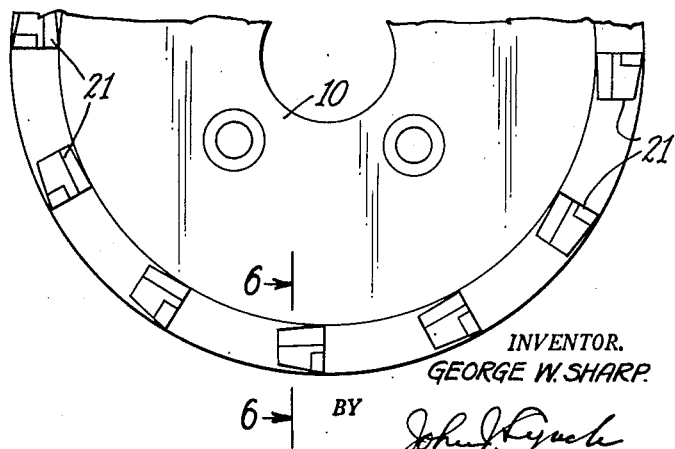
INVENTOR.
GEORGE W. SHARP.
BY Patented May 15, 1951

2,553,151

UNITED STATES PATENT OFFICE 2,553,151

TOOLHOLDER

George W. Sharp, Lodi, N. J.

Application May 12, 1947, Serial No. 747,453

1 Claim. (Cl. 29—96)

This invention relates to machine tools and in particular to means for holding cutting tools in place in the heads in which they are secured.

A particular object of the invention is to provide means for mounting cutting tools in a holder in such a way that the working thrusts on the cutting edges of the tools will be acting against a solid wall of the tool holder rather than against a set screw or other holding means that sometimes loosens and permits the tool to shift an imperceptible amount that results in the inefficient operation of the cutter.

Another important object of the invention is to provide a tool holder of the type for example that may be used as face milling cutters in which standard square tool bits are used and are secured in square broached holes in compact arrangement and by the use of a novel holding wedge that permits ready and rapid adjustment of the tools in place and precise adjustment in small increments of measure without waste of time.

Still further objects of the invention provide for the use of tool holding bores or receptacles that need not be bored to precise dimensions, but in which the tools will be secured against the major wall area by a jamming means so that the thrust of the work is resisted by the solid material of the holder body; to also provide maximum flexibility, rigidity and simplicity combined with a minimum initial cost, lowest blade cost and maintenance features that are time saving in sharpening the tool bits. The invention is particularly directed to single point cutting tools.

With these and other objects in view, the invention comprises certain constructions hereinafter described and then particularly pointed out in the claim and a preferred embodiment of my invention is illustrated in the accompanying drawing, in which:

Figure 1 is a face view of a tool holder constructed in accordance with my invention and showing the arrangement of tools and means for holding the same in place therein, Figure 2 is a view in side elevation of the holder and tools shown in Figure 1, Figure 3 is fragmentary face view of a holder of larger capacity than the one shown in Figures 1 and 2, Figure 4 is a view in perspective of a wedge used in maintaining the tool bits in place in the holder, Figure 5 is an enlarged section taken on the line 5—5 of Figure 2 showing the relative arrangement of the tool bit, the wedge and the locking set screw, Figure 6 is an enlarged view taken on the line 6—6 of Figure 3 showing the slightly modified means for securing the tool in place, and Figure 7 is an enlarged section taken on the line 7—7 of Figure 6 showing the relative arrangement of the locking wedge and the tool body.

Referring to the drawing in detail, 10 indicates a tool holder of well known use which is mounted on a revolving part and which will be hereinafter referred to as a head. The latter is bevelled on its front face as at 11 and formed to provide longitudinally extending bores 12 which are disposed at an oblique angle to the axis of the head so that the tools held therein will be directed outwardly or in flared relation to said axis and protrude from the bevelled face 11 of the holder. The holes are broached so that the square shanks of the tool bits 21 may have easy sliding fit therein.

The head 10 is also bored to provide wedge holes 13 which are arranged at an oblique angle to the tool bores 12 but open thereinto at the face of the head so that when a wedge 14 is pushed into a hole 13 from back to front of said head, it will engage the shank of a tool occupying the tool bore into which said hole opens. The wedge 14 is in the form of a pin, in this instance shown as cylindrical in shape although any desired shape may be used, and is kerfed or channeled as at 15 to provide a right angled seat or saddle which fits over the corner of the shank of the tool. The channel 15 is cut at an angle to the axis of the pin 14 so that as the latter is advanced to a position against the tool shank, it provides a wedging action that jams the tool solidly into place in its bore and forces and holds the latter in place against the solid walls of the head so that the working thrust is resisted by the solid parts of the head and no shifting of the tool is possible. The wedge is held in place and adjusted for tool engaging pressure by a set screw 17 threaded into one end of the bore 13. The right angled face 16 of the wedge pin 14 fills the hole 13 in that portion that intercepts the tool bore 12, it being understood that the wedging pressure is applied all along the length of the channel 15 to the tool.

In the form of the head shown in Figs. 1 and 2, the tools are held in place by the set screws 25 which are disposed in radial threaded holes 24 spaced about the rear peripheral edge of the head and opening into the bores 12.

In the type of enlarged capacity head shown in Figure 3, the head 10 carries the tools 21 in the bores 18, but in this form, the latter are provided with threaded portions 19 into which fit thread plugs or set screws 20 for engagement with the rear end of the tool to hold the same firmly in its adjusted position. The combination of jamming wedge and set screw effectively hold the tool from shifting and also maintain securely in position against the walls of the bore 18 in which it is seated so that not only may very fine adjustments of the tool be made but the tool will be effectively held in such adjusted position and prevented from shifting by the working thrust.

It is evident therefore that I have provided a novel tool structure that may by way of example be used as a milling cutter employing standard square tool bits which may be wedged in place by the use of an ingenious wedging means. It is to be particularly noted that the seat or channel 15 parallels the longitudinal axis of the tool passage and the wedge engages the tool on two faces and near the front face of the holder so that the holding force is applied as close to the work as possible and the wedge has a tool engaging area rather than a restricted portion.

My invention is not to be restricted to the precise details of construction shown since various changes and modifications may be made therein without departing from the scope of the invention or sacrificing the advantages to be derived from its use.

What I claim is:

A tool holder comprising a body having a pair of longitudinally extending bores adjacent the periphery of said body, one of said bores being square in cross section for receiving the square shank of a tool and the other bore being circular in cross section, the bores converging at a slight angle adjacent the working end of the body, the square bore diverging from the longitudinal axis toward said end and the circular bore being parallel to the longitudinal axis of said body, a cylindrical wedge pin slidable lengthwise of the circular bore and being cut inwardly from one end thereof at an oblique angle to the longitudinal axis thereof to provide a recess having right angled walls for engagement with the outer contiguous walls of a tool in the square bore and means for holding said pin and said tool in forced wedging engagement with each other and with the walls of the bore whereby the working thrust of the tool is taken by the inner contiguous faces of the square bore.

GEORGE W. SHARP.

REFERENCES CITED

The following references are of record in the file of this patent:

UNITED STATES PATENTS

| Number | Name | Date |
|---|---|---|
| 318,718 | Gibson | May 26, 1885 |
| 1,242,707 | Lovejoy | Oct. 9, 1917 |
| 1,420,171 | Wille | Jan. 20, 1922 |

FOREIGN PATENTS

| Number | Country | Date |
|---|---|---|
| 15,322 | Austria | Feb. 25, 1904 |
| 21,028 | France | Nov. 26, 1919 |